Sept. 28, 1948.  R. F. WILLIAMS  2,450,322
REPLACEMENT AXLE FOR AGRICULTURAL
IMPLEMENTS OR THE LIKE
Filed Sept. 26, 1947
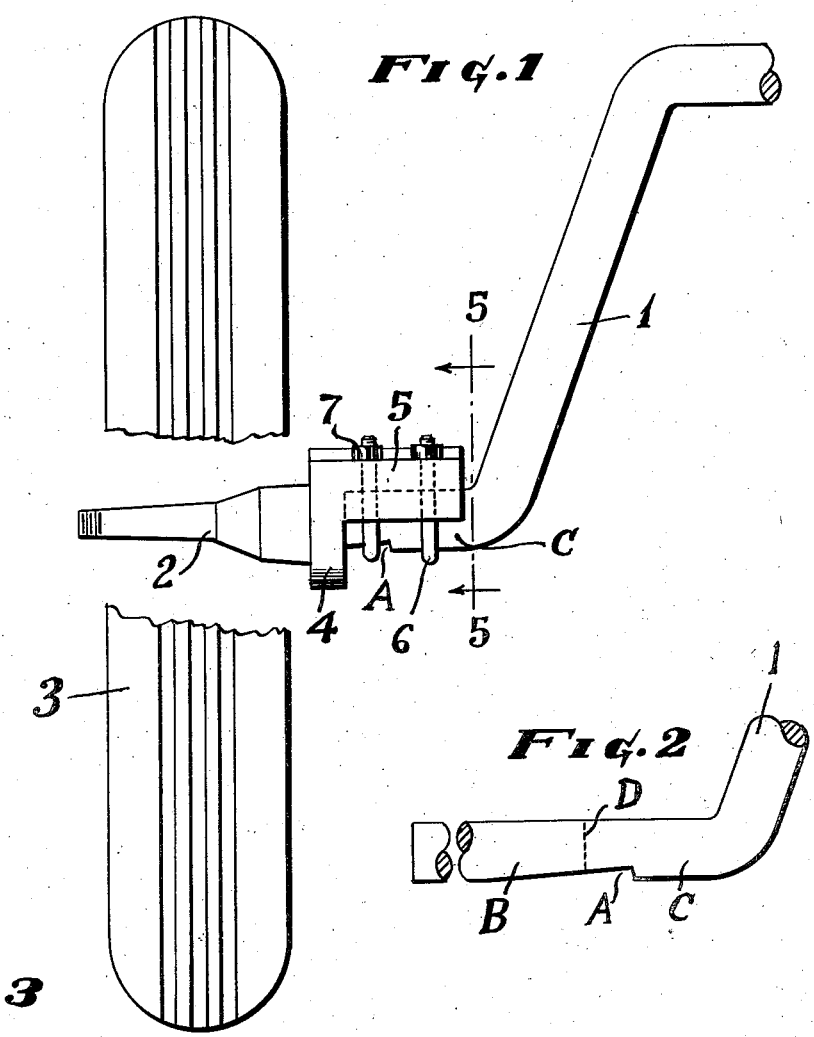
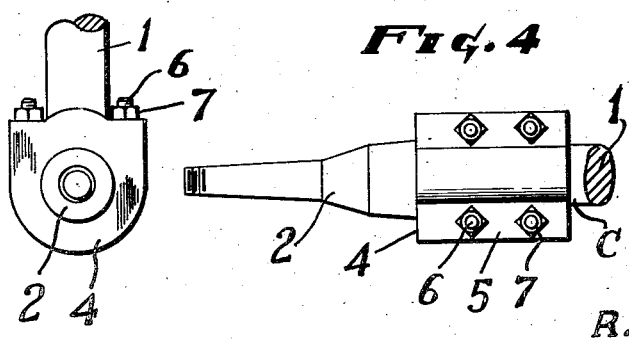
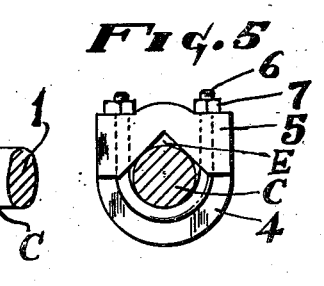
INVENTOR.
R. F. WILLIAMS.
BY
U. G. Charles
atty.

Patented Sept. 28, 1948

2,450,322

UNITED STATES PATENT OFFICE 2,450,322

REPLACEMENT AXLE FOR AGRICULTURAL IMPLEMENTS OR THE LIKE

Ralph F. Williams, Hazelton, Kans.

Application September 26, 1947, Serial No. 776,212

1 Claim. (Cl. 301—132)

This invention relates to a replacement axle for agricultural implements, or the like, and has for its principal object the provision of mounting means for the substitution of an axle for a worn axle that is required to be repaired or discarded.

Another object of this invention is to provide an axle that is capable of replacing the original axle of an agricultural implement by the removal of a major portion of the length of the original axle and substituting therefor a typical conventional spindle of the class upon which tire wheels are journalled, by which arrangement, an obsolete axle is made equal to the present trend of axle and wheel construction.

A still further object is to construct a replacement axle having means to axially align the same with the unremoved portion of the axle, whereby such installation may not require severe adjustment of the implement otherwise.

A still further object is to provide a mounting means for the replacement axle to a crank axle of an implement in such a manner as to receive various diameters of unremoved portions of axles as such axles may vary among the different makes of implements.

A still further object of this invention is to provide an axle of the modern type that may be installed easily as all that is required is the sawing off of a major portion of the original axle and clamping onto the remaining portion the new axle.

A still further object is to provide an axle as an article of manufacture that may be used to substitute the original axle as above described, while the bearings and tire wheel for such new axle may be purchased in its regular business channel.

These and other objects will hereinafter be more fully explained, reference being had to the accompanying drawing forming a part of this specification, and in which like characters will apply to like parts in the different views.

Referring to the drawing:

Fig. 1 is a side view of a replacement axle applied to a stub of a crank axle of an agricultural implement, the bearings and a portion of the wheel being removed for convenience of illustration.

Fig. 2 is a portion of a crank axle prior to being substituted by my replacement axle, said view also showing the worn condition of the axle.

Fig. 3 is an outer end view of the replacement axle.

Fig. 4 is a plan view of the invention, while

Fig. 5 is a sectional view taken on line 5—5 in Fig. 1.

The invention herein disclosed relates to an axle to modernize an obsolete axle as well as to replace a worn obsolete axle of an agricultural implement. Fig. 2 illustrates an obsolete axle, the common wear thereon being shown as at A, the axle otherwise being integrally joined to an upwardly slanting crank portion 1 which is adjustably secured to an agricultural implement in any conventional manner, the implement not being shown in the drawing.

The usual method of repairing a worn axle of the class shown in Fig. 2 is to build up the axle where worn, or remove the worn axle and integrally join to the crank a stub whose length and diameter is equal to the removed portion not considering the worn condition. This operation above set forth requires the removal of the axle crank so that the same may be repaired by a forge shop, or the like.

In the installation of my invention, the axle crank need not be removed as a portion B of the original axle is removed from the stub portion C by sawing on the dotted line D as shown in Fig. 2, whereby the replacement axle may be secured to the stub C.

It will be seen in Fig. 1 that the replacement axle consists of a spindle 2 of typical construction and having the usual bearings mounted thereon of the class for receiving tire wheels 3, said bearings not being shown in the drawing.

Integrally with the inner end of the spindle is a clamping structure to rigidly secure the spindle in axial alignment with the stub portion C of the axle, said structure comprising an enlarged head 4 from which extends the upper half portion 5 of a clamp. Said clamp portion 5 has a longitudinal V-notch E formed in its lower side to rest upon the stub C as shown in Fig. 5 and rigidly secured by U-bolts 6 that engage beneath the stub C and extend through the clamp 5 to threadedly receive nuts 7.

By providing a V-notch in the clamp 5, the same is capable of receiving various diameters of axles, it being understood that bushings may be employed where smaller axles exist so as to axially align the new axle with the stud portion C when such axial alignment is necessary.

The end of the stub C is abutted in contact with the head 4 as shown in Fig. 1, and one of the U-bolts in case of a worn axle will seat on the underside of the axle where worn to serve as a means to avoid longitudinal outward movement of the spindle as well as to avoid turning thereof.

While I have illustrated a preferred manner for carrying forth my invention, I do not wish to be restricted to the exact details in construction and proportion as shown as changes may be made as lie within the scope of the appended claim.

Having fully described my invention what I claim as new and desire to secure by Letters Patent is:

In an axle comprising a spindle having a head integrally joined to one of its ends, said head having the upper portion of a clamp extending oppositely from that of the spindle, said clamp having a V-shaped seat at its underside resting upon a stub of a worn axle, and U-bolts engaging the underside of the stub and co-acting with the clamp in rigidly binding the stub thereto.

RALPH F. WILLIAMS.

REFERENCES CITED

The following references are of record in the file of this patent:

UNITED STATES PATENTS

| Number | Name | Date |
| --- | --- | --- |
| 1,248,684 | Lewis | Dec. 4, 1917 |
| 1,411,981 | Strong | Apr. 4, 1922 |